United States Patent [19]

Giorgi et al.

[11] 4,034,297
[45] July 5, 1977

[54] CIRCUIT FOR DISABLING A RADIO TRANSMITTER WHICH IS CONTINUOUSLY OPERATED LONGER THAN A PREDETERMINED TIME

[75] Inventors: Robert A. Giorgi; James E. Loyd, III, both of Lynchburg, Va.

[73] Assignee: General Electric Company, Lynchburg, Va.

[22] Filed: Jan. 13, 1976

[21] Appl. No.: 648,788

[52] U.S. Cl. .............................. 325/166; 325/111; 340/250
[51] Int. Cl.² .......................................... H04B 1/04
[58] Field of Search .......... 325/161, 162, 166, 169, 325/111; 340/248 C, 248 D, 248 E, 250; 317/36 TD, 114

[56] References Cited

UNITED STATES PATENTS

| | | |
|---|---|---|
| 3,469,191 | 9/1969 | Russell, Jr. et al. ............... 325/166 |
| 3,500,458 | 3/1970 | Cannalte ............................ 325/166 |
| 3,500,459 | 3/1970 | Battin et al. ....................... 325/166 |
| 3,737,887 | 6/1973 | Wakamatsu et al. .............. 340/250 |
| 3,745,546 | 7/1973 | Struger ............................... 340/250 |

Primary Examiner—Robert L. Griffin
Assistant Examiner—Jin F. Ng
Attorney, Agent, or Firm—James J. Williams

[57] ABSTRACT

A timer and fuse circuit are provided with a radio transmitter for blowing the fuse if the transmitter is continuously operated longer than a predetermined time. After the fuse is blown, the transmitter cannot be operated until a technician replaces the fuse. This prevents operators from causing willful interference for long periods of time, and provides means for detecting those operators who cause such interference.

9 Claims, 2 Drawing Figures

CIRCUIT FOR DISABLING A RADIO TRANSMITTER WHICH IS CONTINUOUSLY OPERATED LONGER THAN A PREDETERMINED TIME

BACKGROUND OF THE INVENTION

Our invention relates to a disabling circuit for a radio transmitter, and particularly to such a disabling circuit that disables the transmitter after a predetermined time period of continuous operation of the radio transmitter, and that requires a technician to restore the transmitter to operation.

In a typical mobile radio communication system, there is a fixed base station and a number of mobile stations which operate on an assigned radio channel. Such systems are very important to a number of services, one of which is a taxicab service. A taxicab service relies on a dispatcher at the base station receiving telephone calls from people who desire the cab service. In response to such a telephone call, the dispatcher will then transmit a request by radio to one of his taxicabs to respond to the customer who calls. Unfortunately, the dispatcher may not know the location of his taxicabs, or may have a preference for one of the taxicab drivers over another taxicab driver. In any case, if a taxicab driver feels that he is getting less service calls than he deserves or should get, he may key (or turn on) his radio transmitter for a long period of time, but not talk into his microphone. In a frequency modulation system, this effectively prevents any calls from being transmitted on the assigned radio channel, with the result that no one sends or receives messages, and the taxicab service becomes inefficient or even useless. However, the driver does not talk and thus remains anonymous.

Accordingly, a primary object of our invention is to provide a new and improved circuit that disables a radio transmitter after it has been continuously operated for longer than a predetermined time.

Another object of our invention is to provide a new and improved circuit that disables but does not damage a radio transmitter which is continuously keyed for an excessive period of time.

While it is desirable to prevent intentional or willful interference, it is also desirable that the taxicab company be able to restore the radio transmitter after it is disabled, and to also be able to know which taxicab driver caused the interference which resulted in the disabling of the radio transmitter.

Accordingly, another object of our invention is to provide a new and improved circuit that disables a radio transmitter which is continuously operated longer than a predetermined time, and which requires a licensed technician or serviceman having knowledge of the radio transmitter to restore the transmitter to operation.

SUMMARY OF THE INVENTION

Briefly, these and other objects are achieved in accordance with our invention by a timing circuit which can be connected to the radio microphone. The timing circuit is arranged to produce a timing signal after the microphone has been operated for a predetermined continuous time period. A fuse circuit is connected to the timing circuit, and is arranged so that the fuse is blown after the timing signal is produced. An output circuit is connected to the fuse circuit and to the microphone so that after the fuse has blown, the output circuit produces an output signal in response to further microphone operation. This output signal is utilized to prevent the radio transmitter from operating. In addition, this output signal can also be used to provide an audible signal to indicate to the transmitter operator that his transmitter has been disabled. Upon the transmitter being disabled, a licensed technician is required to replace the fuse in the transmitter. At the time of such replacement, the technician can ascertain which operator caused the transmitter to be disabled in response to excessive continuous operation.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF A PREFERRED EMBODIMENT

Figure 1:
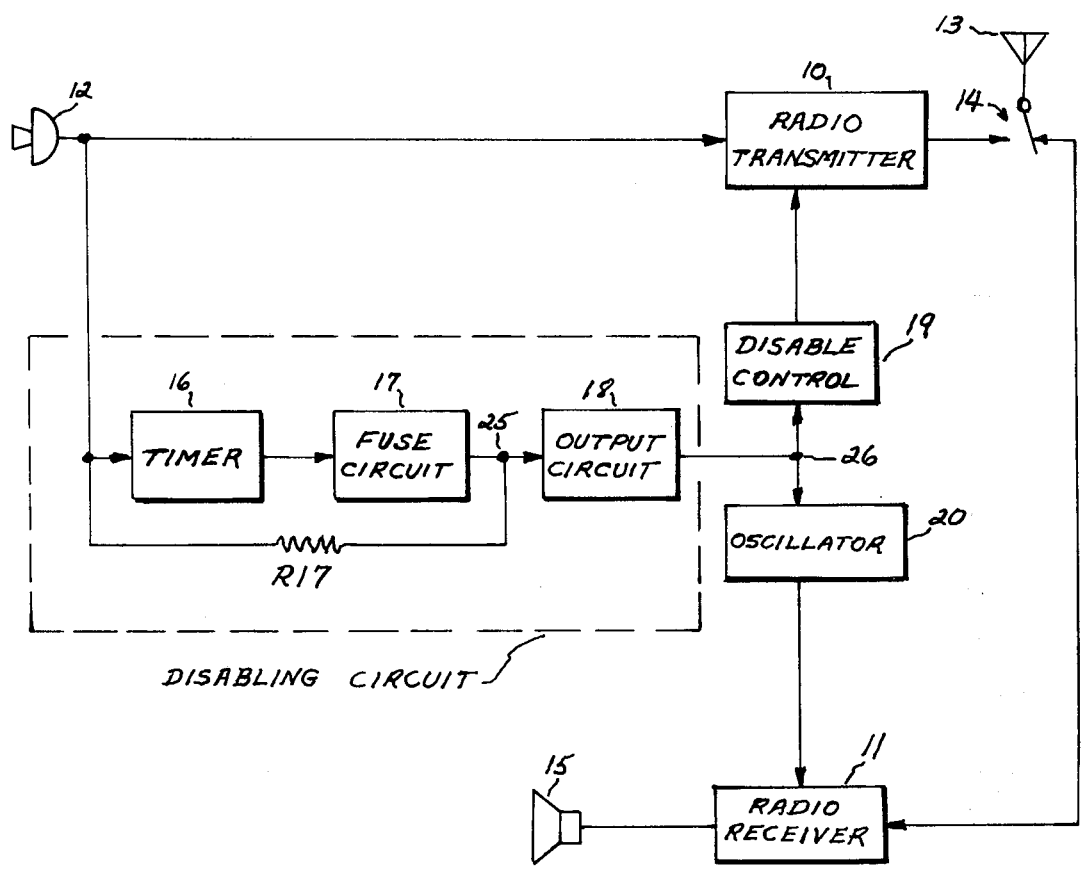
FIG. 1 shows a block diagram of a radio transmitter and a radio receiver provided with a disabling circuit in accordance with our invention.

In FIG. 1, we have shown a block diagram of a radio transmitter 10 and a radio receiver 11 which are provided with a disabling circuit in accordance with our invention. In the mobile services, such a radio transmitter and receiver typically operate with frequency modulation. Since such transmitters and receivers are well known in the art, they will not be described here. A microphone 12 is provided and connected to the radio transmitter 10. Typically, the transmitter 10 is of the push-to-talk type which is turned on or keyed by a push button on the microphone 12 that is pressed when the operator wishes to transmit. When the microphone button is pressed or operated, the radio transmitter 10 is turned on, and the radio receiver is usually blocked or turned off. The output of the radio transmitter 10 is connected to an antenna 13 through a switch or relay 14. When the microphone button is operated, the relay 14 operates so as to connect the transmitter 10 to the antenna 13. When the microphone button is released, the relay 14 operates to the position shown in FIG. 1 so as to connect the antenna 13 to the radio receiver 11. The radio receiver output is supplied to a loudspeaker 15. The circuit described thus far is well known in the art.

In accordance with our invention, we provide the radio transmitter 10 and the radio receiver 11 with a disabling circuit. This disabling circuit includes a timer 16 which is connected to the microphone 12. The timer 16 is arranged to sense when the microphone 12 is operated (that is when the microphone button is depressed). If the microphone button is continuously pressed or operated for longer than a predetermined time period, the timer 16 produces a timer signal. This timer signal is applied to a fuse circuit 17 which causes a fuse within the circuit 17 to blow or melt. When the fuse in the circuit 17 is blown, it produces an output signal or condition to an output circuit 18. This condition is such that when the microphone button is operated again or continues to be operated, this operation can be sensed by the output circuit 18 through a resistor R17, with the result that the output circuit 18 produces an output signal. In other words, the output circuit 18 produces the output signal after a fuse in the circuit 17 has blown and the microphone button is then operated. This output signal is applied to a disable control 19 which is connected to the radio transmitter 10 to prevent the transmitter 10 from operating even though the microphone button is operated and would otherwise cause the transmitter 10 to operate. Thus, the transmitter 10 is disabled after the microphone button has been operated continuously for longer than a predetermined time period.

The output signal from the circuit 18 may also be applied to an oscillator 20 to cause the oscillator 20 to produce a signal, preferably an audible tone, which is applied to the appropriate audio section of the radio receiver 11 and the loudspeaker 15. Thus, an operator who may have no technical knowledge or understanding will understand that if he hears the audible tone in his loudspeaker 15, he knows that his radio transmitter 10 is disabled. The operator can then go to a licensed technician or serviceman to have his transmitter 10 restored by replacing the fuse in the circuit 17. When this restoration is made, the technician will know which operator operated his transmitter for an excessive time period, and advise the owner of the communication system the identity of that operator. Thus, appropriate safeguards and action can be taken as needed. And most importantly, willful interference for a period longer than a predetermined time interval can be prevented. And as pointed out earlier, this is quite important in the taxicab service where taxicab drivers may and frequently do cause willful interference and interruption of the taxicab dispatching calls.

Figure 2:
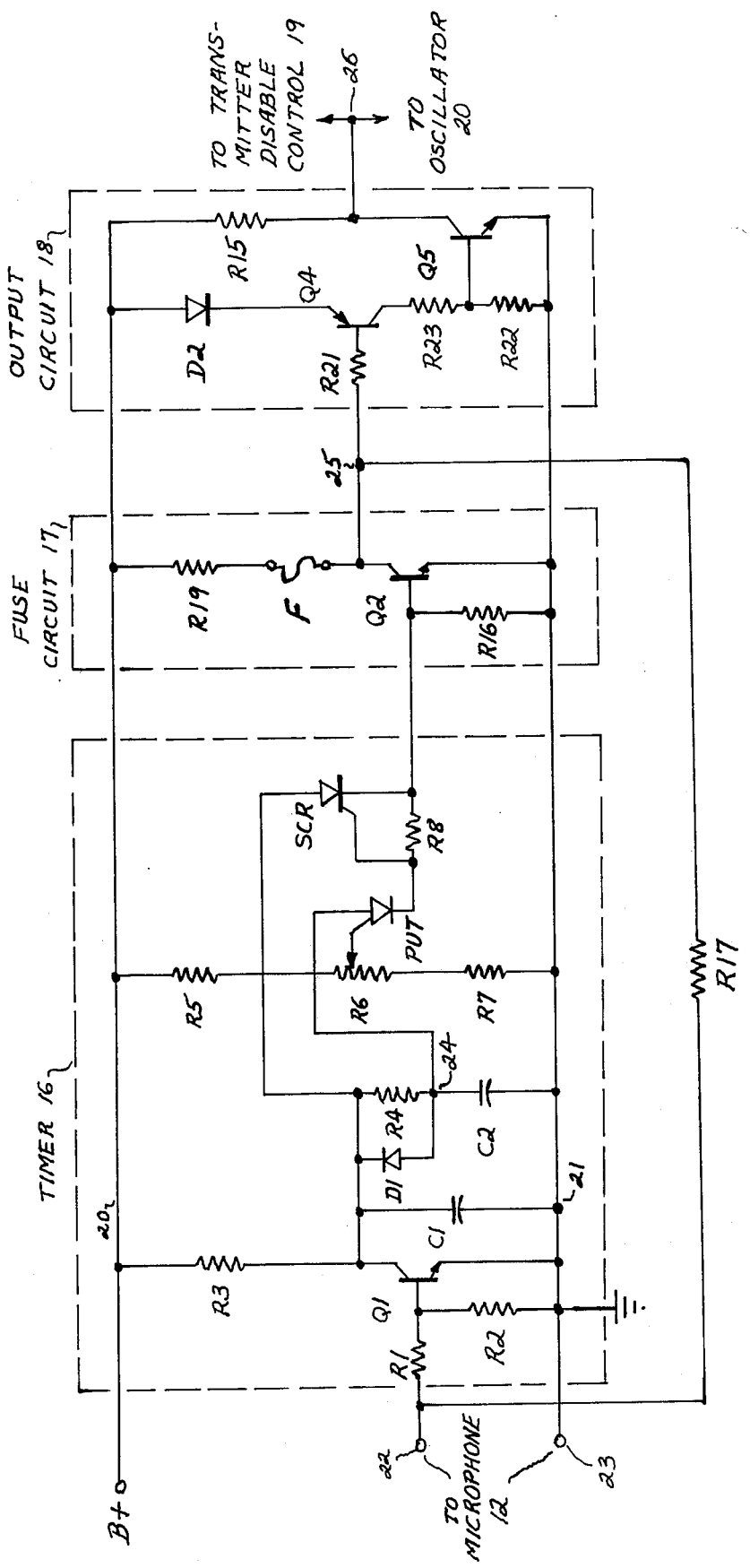
FIG. 2 shows a schematic diagram of one embodiment of a disabling circuit in accordance with our invention.

FIG. 2 shows a schematic diagram of one embodiment of our disabling circuit shown in block diagram form in FIG. 1. The basic elements of our disabling circuit are the timer 16, the fuse circuit 17, and the output circuit 18, each of which is shown enclosed in a respective dashed line rectangle with the same reference numeral. Our disabling circuit is provided with a suitable source of direct current potential B+ (which is usually provided for the transmitter 10 and receiver 11). This source can be connected between a bus or line 20 and a ground or reference bus 21.

In the timer 16, input terminals 22, 23 are provided for connection to the microphone 12. One input terminal 23 is connected to the ground bus 21, and the other input terminal 22 is connected through a resistor R1 to an input NPN type transistor Q1. In this application, we have assumed that when the terminals 22, 23 are connected to the microphone 12, the terminal 22 is normally positive with respect to the terminal 23 so that the transistor Q1 is normally conducting current from the bus 20 through its collector resistor R3 to the bus 21. When the microphone button is depressed, the input terminal 22 becomes zero or a relatively low voltage with respect to the terminal 23 so as to turn the transistor Q1 off. When the transistor Q1 is turned off, current from the positive bus 20 flows through the resistor R3 and a resistor R4 to a timing capacitor C2. Thus, the capacitor C2 begins to charge when the button of the microphone 12 is depressed so that the voltage on its upper terminal 24 becomes increasingly positive. This voltage is applied to the anode of a programmable unijunction transistor PUT. The gate of the transistor PUT is connected to the movable tap of a resistor R6 connected in a voltage dividing circuit with resistors R5, R7 between the busses 20, 21. The setting of the movable tap on the resistor R6 determines the voltage required at the anode of the transistor PUT in order for the transistor PUT to fire or conduct. If the microphone button is released before the transistor PUT fires (that is before the voltage at the terminal 24 becomes sufficiently positive), the transistor Q1 conducts and the capacitor C2 discharges through a diode rectifier D1 and the transistor Q1 so as to reset the timer 16. The cathode of the transistor PUT is connected to the gate electrode of a control rectifier SCR. The anode of the rectifier SCR is connected through the resistor R3 to the bus 20. A resistor R8 is connected between the gate and cathode of the rectifier SCR to insure that the rectifier continues to conduct once it is fired. With the tap on the resistor R6 set to provide a selected voltage, and in response to the microphone button being depressed, the capacitor C2 begins to charge. When the voltage on the terminal 24 reaches a selected magnitude (representing a selected or predetermined time period), the transistor PUT fires and causes the rectifier SCR to conduct. The rectifier SCR produces an output pulse that continues until the rectifier is reset. This reset occurs when the microphone button is released, and the transistor Q1 begins to conduct again. The capacitor C2 is also discharged through the diode rectifier D1 and the transistor Q1.

The output pulse produced by the rectifier SCR represents the output signal produced after a selected time period. The time period is determined by the setting of the tap on the resistor R6. This output pulse is applied to the fuse circuit 17, and specifically to the base of an NPN type transistor Q2. This pulse causes the transistor Q2 to conduct, and this conduction permits current to flow from the bus 20 through a resistor R19 and a fuse F to the bus 21. This current flow causes the fuse F to blow or melt. When this occurs, the positive voltage at the collector of the transistor Q2 (and at its output terminal 25) is removed.

The removal of this positive voltage from the terminal 25 permits the terminal 25 to follow the voltage at the terminal 22 through the resistor R17 connected between the terminals 22, 25. After this positive voltage is removed from the terminal 25, if the microphone button is still operated or is subsequently operated, the low or zero voltage on the terminal 22 causes the voltage on the terminal 25 to become low. This causes a PNP type transistor Q4 in the output circuit 18 to conduct, which in turn causes an NPN type amplifier transistor Q5 to also conduct. The collector of the transistor Q5 is connected to a terminal 26. When the transistor Q5 conducts, the voltage at the terminal 26 goes very low or to zero. This zero voltage represents the disabling circuit output signal, and is applied to the disable control 19 which prevents operation of the radio transmitter 10 of FIG. 1. This same signal may also be applied to the oscillator 20 to produce an audible signal in the loudspeaker 15 in FIG. 1.

Thus, when an operator depresses his push-to-talk button on his microphone 12 for an extended period of time, the timing capacitor C2 is charged to a sufficient voltage (relative to the tap setting of the resistor R6) to cause the timer 16 to produce an output signal after a predetermined continuous time interval. (Shorter time intervals permit the capacitor C2 to discharge.) This output signal causes the fuse F in the fuse circuit 17 to blow, with the result that the output terminal 25 is no longer held at a relatively positive voltage. This permits the low voltage produced on the microphone terminal 22 to control the output circuit 18 and cause this circuit 18 to produce the zero or low voltage disabling signal at the terminal 26. In order to restore the transmitter, the operator must take his transmitter to a licensed technician or repair shop in order that the fuse F can be replaced. We prefer that the fuse F be located at some point within the radio transmitter that is inaccessible to the average person, thus further precluding restoration of the transmitter.

It will be seen that we have provided a new and improved disabling circuit that prevents operators from keying or turning on their radio transmitters for an excessive or extended period of time, this period of time being predetermined by setting the tap on the resistor R6. And, once the transmitter is disabled, it requires a licensed technician or service man to restore it. While we have shown only one schematic diagram of our disabling circuit, persons skilled in the art will appreciate that many modifications may be made. For example, our timer 16 may utilize a digital type of counter which is started in response to microphone operation and which produces an output signal to the fuse circuit 17 after a predetermined count (representing a time period) has been reached. Such a counter would be reset if the microphone button is released before the predetermined count is reached. While other disabling devices (such as a diode with limited current carrying capacity) can be used, we prefer the fuse F. The output circuit 18 may comprise a logic gate having a control input connected to the output collector of the transistor Q2, a signal input connected to the microphone terminal 22, and an output which can respond to the microphone operation when the control input is gated (by the timer 16 producing an output). The disabling control 19 may function in any desired way, such as by removing power from the output stage of the transmitter 10. And finally, while use of the oscillator 20 is optional, we prefer that it (or some device such as a lamp) be used to indicate to an operator that his transmitter is disabled. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An arrangement for preventing a person from keying a radio transmitter for more than a predetermined continuous time period by operation of a microphone, said arrangement comprising:
    a. an input circuit for receiving a signal indicative of the operation of said microphone for said radio transmitter;
    b. a timing circuit connected to said input circuit for producing a timing signal in response to said microphone operation signal exceeding a predetermined continuous time period;
    c. a fuse circuit connected to said timing circuit for blowing a fuse in response to said timing signal;
    d. an output circuit connected to said fuse circuit and to said input circuit for producing an output signal in response to said fuse being blown and in response to said microphone operation signal;
    e. and means for connecting said output circuit to said radio transmitter for preventing operation of said radio transmitter in response to said output signal.

2. A circuit for reducing willful interference caused by holding the microphone button of a radio transmitter in an operated condition for longer than a predetermined time comprising:
    a. input means for providing an operated signal in response to said microphone button being in an operated condition;
    b. timing means connected to said input means for timing the time duration of said operated signal and producing a timer output signal in response to said operated signal exceeding a time period without interruption;
    c. means including a fuse connected to said timing means, said fuse means having a normal condition and being changed to a blown condition in response to said timer output signal;
    d. means connected to said fuse means and to said input means for producing a disable signal in response to both said fuse means being in said blown condition and said operated signal at the same time;
    e. and means connected to said disable signal producing means for disabling said radio transmitter in response to said disable signal.

3. The circuit of claim 2 and further comprising sound generating means connected to said disable signal producing means for producing an audible sound in response to said disable signal.

4. The circuit of claim 2 wherein said timing means include manually operable means for changing the length of said time period.

5. The circuit of claim 4 wherein said timing means comprise a capacitor charging circuit.

6. An improved circuit for use with a radio transmitter that is normally keyed by operation of a microphone, said circuit comprising:
    a. input means for receiving a signal indicative of the operation of the microphone of the radio transmitter;
    b. timing means connected to said input means for producing a timing signal following receipt of said microphone indicative signal for a continuous, predetermined length of time;
    c. a fuse circuit connected to said timing means and operating in response to said timing signal;
    d. gate means having a first input connected to said input means and a second input connected to said fuse circuit, said gate means producing a disabling signal in response to said microphone indicative signal and said fuse circuit being operated;
    e. and output means connected to said gate means for preventing operation of said radio transmitter in response to said disabling signal despite an attempt to key said radio transmitter by operation of said microphone.

7. The improved circuit of claim 6 wherein said fuse circuit can only be restored to a normal condition by replacement of a fuse.

8. The improved circuit of claim 7 and further comprising indicating means connected to said gate means and that respond to said disabling signal.

9. The improved circuit of claim 6 wherein said timing means are reset in response to the operation of said microphone being terminated prior to said continuous, predetermined length of time.

* * * * *